March 26, 1929.  G. W. PANGBURN  1,706,678

FLYWHEEL

Filed May 2, 1927

Inventor

George W. Pangburn

By T. J. Elliott
Attorney

Patented Mar. 26, 1929.

1,706,678

UNITED STATES PATENT OFFICE.

GEORGE W. PANGBURN, OF TACOMA, WASHINGTON.

FLYWHEEL.

Application filed May 2, 1927. Serial No. 188,221.

This invention relates to flywheels adapted to steady the rotation of a shaft. The object of my invention is to increase the "pick up" of the engine. I attain this object by providing a flywheel having a variable distribution of weights and therefore a variable moment of inertia, increasing with an increase in the rate of rotation, whereby the energy absorbed by the flywheel is proportionately less when the engine is rotating slowly than when it is turning at a higher speed; so that a sudden increase in the torque of the engine shaft produces a higher increase in the rate of rotation thereof than the same increase in torque would with a flywheel of fixed greater moment of inertia.

Figure 1:
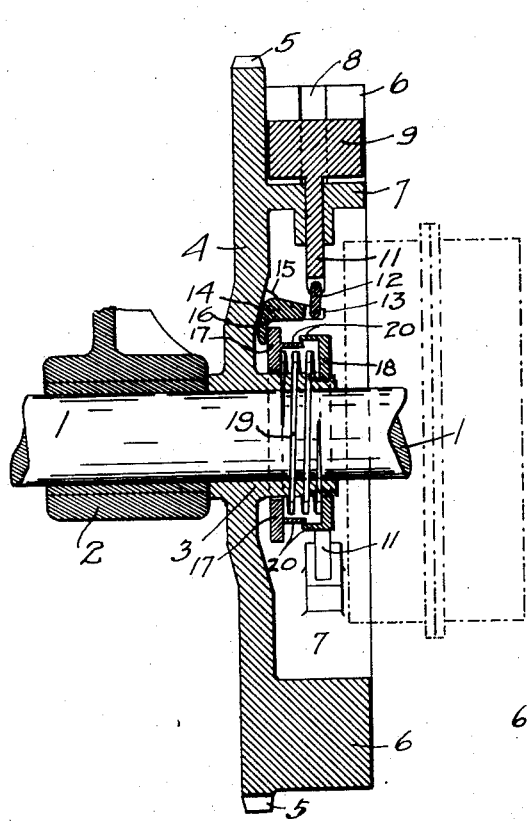
Figure 2:
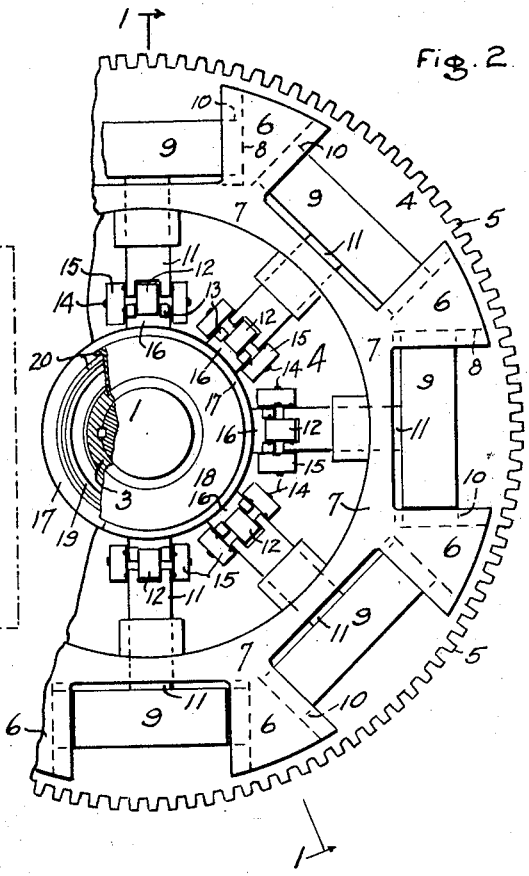
Figure 3:
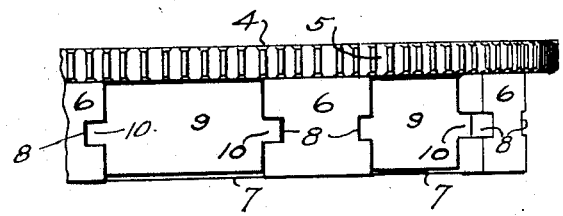

I attain this and other objects by the devices, mechanisms, and arrangements, illustrated in the accompanying drawings, in which:— Fig. 1 is a vertical section of my improved flywheel taken on the line 1—1 in Fig. 2; Fig. 2 is an end elevation thereof, a portion thereof being broken away; and Fig. 3 is a plan view of a portion thereof.

Similar numerals of reference refer to similar parts throughout the several views.

It is a well-known fact that the effect of a flywheel is not proportionate to its weight but to the distribution of its weight in relation to the center of rotation. This effect is determined by a factor known as the moment of inertia of the axial section through the flywheel and by the area of the said section. The weight of the flywheel varies, of course, directly with the area of the section but the moment of inertia depends on the distribution of the weight in relation to the center of rotation of the flywheel. The moment of inertia of the flywheel is the sum of the products of the weight of each particle in the flywheel multiplied by the square of its distance from the center of rotation. Therefore the moment of inertia of a body whose greatest concentration of material is near the center of rotation is very much less than that of a body of equal weight whose material is concentrated further from the said center.

When an engine is running slowly and it is desired to suddenly change its rate to a high speed, then the amount of energy which is absorbed by the flywheel by the sudden change depends on the moment of inertia of the flywheel and if this is small then the increase in speed is correspondingly rapid, but if the moment of inertia is large the increase of speed is small, and the energy absorbed by the flywheel is correspondingly large. It is desirable in the mechanical operation, especially of gasoline engines and more especially in automobiles, to provide a flywheel which will effectively steady the rotation of the shaft by absorbing the high forces at the time of each explosion and returning the energy to the shaft at intermediate points. A flywheel designed to accomplish this effect and to produce smooth running when the engine is running at its normal economic speed has too large a moment of inertia to permit any sudden change from a low idling speed to a high working speed. Also, a flywheel designed to permit this sudden pickup of speed would have a moment of inertia too small to cause the engine to run smoothly when doing its full work.

In order to combine these two opposite conditions I have invented the following described flywheel in which the moment of inertia automatically increases with an increase in speed and decreases with the decrease thereof.

Referring to the drawings, the shaft 1 is mounted in a suitable bearing 2 and is provided with a flywheel attached thereto. This flywheel is provided with a central boss 3 and with a disk 4 extending outward therefrom. The disk 4 may conveniently be provided with gear teeth 5 on its outer periphery for the purpose of gearing with the usual starter mechanism whereby the engine is started. The ring which usually forms the main weight of the flywheel is located as far as possible from the center of the shaft and is, in my invention, substituted by a series of lugs 6 extending laterally from the said disk 4 at uniform distances apart and of uniform size and shape. The inner portions of all these lugs 6 may conveniently be secured together by means of the ring flange 7 extending around the flywheel. The adjacent edges of each pair of lugs 6 are parallel with each other and with the radius from the center of shaft 1 to the center of the space between the said pair of lugs. Each said lug is provided with a groove 8 in its said sides adapted to guide the hereinafter described movable weights. The above parts all form one body having a fixed moment of inertia.

Within the space between each two adjacent lugs 6 I mount a movable weight 9 having guide lugs 10 which enter the said grooves 8 in the sides of the said lugs 6. Each of these movable weights 9 is free to move outward between the said lugs, under the action of the centrifugal force thereon when the flywheel is rotated, and this outward motion is resisted by the following described mechanism. Each weight 9 is provided with an inward extending shank 11 which passes through the flange 7 towards the center of the shaft. A link 12 is pivotally attached to the end of the said shank 11 and connects it to the end of the long arm 13 of a bell-crank lever. The bell-crank lever is pivoted at 14 between two lugs 15 extending from the disk 4 of the flywheel. The short arm 16, of the bell-crank lever, extends inward toward the shaft and engages the front surface of a disk 17. The disk 17 is loosely mounted on the boss 3 and is free to move axially thereon. A flange 18 is adjustably secured to the end of the boss 3 and extends outward therefrom. A helical spring 19 is coiled around the boss 3 between the flange 18 and the disk 17 and presses the said disk away from the said flange. Telescoping flanges 20 may be formed on the disk 17 and on the flange 18 to form a box adapted to enclose the said spring.

Thus it will be seen that the spring 19 pushes the disk 17 against all of the short arms 16 of all the bell-crank levers to turn them on their pivots 14 and to draw all of the weights 9 inward toward the center of the flywheel. As the flywheel rotates, the centrifugal force applied to all of the said moving weights 9 tend to force them outward between the lugs 6 and against the action of the said spring 19, until the sum of all the centrifugal forces is balanced by the resistance of the compressed spring 19. When the said moving weights 9 are in their innermost positions, the moment of inertia of the wheel is less than when they are at their outermost position. The energy necessary for turning the engine at a slow speed is therefore less than if the weights 9 were in their outermost positions. As the speed of the flywheel increases the moment of inertia thereof increases because the weights 9 move outward thereon.

Having therefore described my invention what I claim is:—

1. An automatically variable flywheel, comprising a main rotating wheel, having an enlarged rim; a series of recesses formed in the outer periphery of said rim, the central line of each recess being radial from the center of said wheel and the sides being parallel with said central lines; weights mounted in said recesses, each said weight being of less depth than the recess in which it fits and being free to move outwardly in said recess under the action of centrifugal force; and resilient restraining means engaging all said weights equally and adapted to oppose the outward movement thereof.

2. An automatically variable flywheel, comprising a main rotating wheel, having an enlarged rim; a series of recesses formed in the outer periphery of said rim, the central line of each recess being radial from the center of said wheel and the sides being parallel with said central lines; guide grooves formed in the sides of said recesses; weights mounted in said recesses, each said weight being of less depth than the recess in which it fits and being free to move outwardly in said recess under the action of centrifugal force; guide lugs formed on said weights and extending therefrom to engage in said guide grooves whereby the weights are guided in said recesses; and resilient restraining means engaging all said weights equally and adapted to oppose the outward movement thereof.

3. An automatically variable compound flywheel, comprising a main rotating wheel, having an enlarged rim, said main wheel having a fixed moment of inertia; recesses formed in said rim, thereby reducing the normal moment of inertia of said wheel; weights mounted in each said recess and outwardly slidable therein under the action of centrifugal force thereon, said weights together partially restoring the moment of inertia of the complete wheel when they are positioned at the inner ends of said recesses and increasingly restoring the moment of inertia of the complete wheel as they moved outward towards their outermost positions; and a single resilient means engaging all said weights through intermediate mechanism and opposing equally their outward movement in said recesses, whereby the combined moment of inertia of the complete wheel is less than it is rotated slowly than when it has attained a normal rate of rotation and whereby its resistance to a change in the rate of rotation is proportionately less when rotating slowly than when rotated at normal speed.

GEORGE W. PANGBURN.